(12) United States Patent
Kikutani et al.

(10) Patent No.: US 9,732,443 B2
(45) Date of Patent: Aug. 15, 2017

(54) POLYESTER FIBER

(71) Applicants: TOKYO INSTITUTE OF TECHNOLOGY, Meguro-ku (JP); KANEKA CORPORATION, Osaka-shi (JP)

(72) Inventors: Takeshi Kikutani, Tokyo (JP); Wataru Takarada, Kanagawa (JP); Noriyuki Suzuki, Settsu (JP); Tetsuya Minami, Settsu (JP); Takahiko Sugaya, Settsu (JP)

(73) Assignees: TOKYO INSTITUTE OF TECHNOLOGY, Meguro-ku (JP); KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 14/915,648

(22) PCT Filed: Jul. 16, 2014

(86) PCT No.: PCT/JP2014/003773
§ 371 (c)(1),
(2) Date: Mar. 1, 2016

(87) PCT Pub. No.: WO2015/029316
PCT Pub. Date: Mar. 5, 2015

(65) Prior Publication Data
US 2016/0230313 A1    Aug. 11, 2016

(30) Foreign Application Priority Data

Sep. 2, 2013    (JP) .................................. 2013-181537

(51) Int. Cl.
| | |
|---|---|
| C08G 63/02 | (2006.01) |
| D01F 6/84 | (2006.01) |
| D01F 6/62 | (2006.01) |
| B29C 47/88 | (2006.01) |
| C08G 63/06 | (2006.01) |
| B29C 47/00 | (2006.01) |
| B29K 67/00 | (2006.01) |
| B29L 31/00 | (2006.01) |

(52) U.S. Cl.
CPC ............ D01F 6/84 (2013.01); B29C 47/0014 (2013.01); B29C 47/8805 (2013.01); C08G 63/06 (2013.01); D01F 6/625 (2013.01); B29K 2067/00 (2013.01); B29L 2031/731 (2013.01); C08G 2230/00 (2013.01); D10B 2331/041 (2013.01); D10B 2401/063 (2013.01); D10B 2401/12 (2013.01); D10B 2401/20 (2013.01)

(58) Field of Classification Search
CPC .................................................. C08G 63/06
USPC .......... 264/239; 428/373; 525/437; 528/271, 528/272
See application file for complete search history.

(56) References Cited

U.S. PATENT DOCUMENTS

| | | | | |
|---|---|---|---|---|
| 5,593,778 A | * | 1/1997 | Kondo ................... | C08G 63/60 264/239 |
| 2002/0143116 A1 | | 10/2002 | Noda et al. | |
| 2003/0088052 A1 | * | 5/2003 | Yamane .................. | D01F 6/625 528/272 |

FOREIGN PATENT DOCUMENTS

| | | |
|---|---|---|
| JP | 60-134019 A | 7/1985 |
| JP | 60-134022 A | 7/1985 |
| JP | 5-5208 A | 1/1993 |
| JP | 5-287609 A | 11/1993 |
| JP | 5-321024 A | 12/1993 |
| JP | 6-17317 A | 1/1994 |
| JP | 6-287810 A | 10/1994 |
| JP | 10-37020 A | 2/1998 |
| JP | 11-61561 A | 3/1999 |
| JP | 11-241216 A | 9/1999 |
| JP | 2001-49526 A | 2/2001 |
| JP | 2002-105753 A | 4/2002 |
| JP | 2002-371431 A | 12/2002 |
| JP | 2006-274520 A | 10/2006 |
| JP | 2012-57120 A | 3/2012 |
| JP | 2013-87392 | 5/2013 |
| WO | WO 2010/075530 | 7/2010 |

OTHER PUBLICATIONS

International Search Report issued Oct. 21, 2014 in PCT/JP2014/003773.
English translation of International Preliminary Report on Patentability and Written Opinion issued Mar. 8, 2016 in PCT/JP2014/003773.
Kei Nagayama, et al., "Effects of thermal history on poly[(R)-3-hydroxybutyrate-co-(R)-3-hydroxyhexanoate] fibers" Polymer Preprints, Annual Meeting of the Society of Polymer Science, vol. 61. No. 1, May 15, 2012, p. 2018 (with English Abstract).
Mitsui Chemical Analysis & Consulting Service, Inc., "Determination of Degree of Orientation of Polymers by WAXD (Wide Angle X-ray Diffraction) Analysis", at http://www.mcanac.co.jp accessed Mar. 9, 2017 2 pages.
Extended Search Report issued Jun. 7, 2017 in European patent application No. 14 83 9698.
Bond, "Fiber spinning behavior of a 3-hydroxybutyrate/3-hydroxyhexanoate copolymer", Macromol. Symp., 2003, vol. 197, No. 1, pp. 19-31.
Schmack et al, "Biodegradable fibers of poly(3-hydroxybutyrate) produced by high-speed melt spinning and spin drawing", Journal of Polymer Science Part B: Polymer Physics, 2000, vol. 38, No. 21, pp. 2841-2850.

\* cited by examiner

Primary Examiner — Terressa Boykin
(74) Attorney, Agent, or Firm — Oblon, McClelland, Maier & Neustadt, L.L.P.

(57) ABSTRACT

An object of the present invention is to improve spinnability, productivity, and tensile strength of a polyester fiber containing poly(3-hydroxybutyrate-co-3-hydroxyhexanoate).
By spinning the polyester resin containing the poly(3-hydroxybutyrate-co-3-hydroxyhexanoate) at a high spinning velocity, the spinnability, productivity, and tensile strength of the polyester fiber can be improved.

22 Claims, 2 Drawing Sheets

POLYESTER FIBER

TECHNICAL FIELD

The present invention relates to a polyester fiber, and particularly to a fiber obtained by melt-spinning a 3-hydroxyalkanoate polymer at high speed, the 3-hydroxyalkanoate polymer being degraded by the action of a microorganism.

BACKGROUND ART

In recent years, biodegradable plastics have been actively developed as materials that can solve problems caused by plastic waste that places a heavy burden on the global environment, such as impact on the ecosystem, generation of harmful gases during combustion, and global warming due to a large amount of heat generated by combustion.

In particular, carbon dioxide generated by combustion of plant-derived biodegradable plastics was originally present in the air, and therefore the amount of carbon dioxide in the air does not increase. This is referred to as carbon neutral, and is regarded as important under the Kyoto Protocol that sets carbon dioxide reduction targets. For this reason, biodegradable plastics have been expected to be actively used.

Recently, from the viewpoint of biodegradability and carbon neutral, aliphatic polyester resins, especially polyhydroxyalkanoate (hereinafter, sometimes referred to as PHA) resins have received attention as plant-derived plastics. Among PHA resins, for example, poly(3-hydroxybutyrate) homopolymer resins, poly(3-hydroxybutyrate-co-3-hydroxyvalerate) copolymer resins, poly(3-hydroxybutyrate-co-3-hydroxyhexanoate) copolymer resins (hereinafter, sometimes referred to as P3HB3HH), poly(3-hydroxybutyrate-co-4-hydroxybutyrate) copolymer resins, and polylactic acid have received attention.

However, the PHA resin is low in crystallization speed. Therefore, the PHA resin requires a long cooling time for solidification after heat melting in molding processing. Thus, productivity is poor. On this account, a spinning velocity when melt-spinning the PHA resin needs to be extremely low, so that there are restrictions from a viewpoint of practical use. Further, to increase the strength, the PHA resin needs to be stretched after the take-up.

Disclosed as a prior example of a technology of melt-spinning the 3-hydroxyalkanoate polymer is a cold stretching method of: immediately after the P3HB3HH is extruded from a melt extruder, rapidly cooling the P3HB3HH to not more than a glass transition temperature Tg of the resin to prevent blocking of filaments of the P3HB3HH; and quickly and partially crystallizing the P3HB3HH at a temperature not lower than the glass transition temperature Tg (see PTL 1). This method can realize the spinning of a polymer, such as the P3HB3HH, which is hardly crystallized, and can produce stretched filaments having unique properties. On the other hand, since this method requires an essential step of rapidly cooling the P3HB3HH to not more than the temperature Tg (about 0 to 4° C.) immediately after the spinning, energy consumption is large, and large-scale equipment is required. Thus, problems remain from a viewpoint of practical use.

On the other hand, it is known that by melt-spinning thermoplastic polyesters such as poly(ethylene terephthalate) or poly(butylene terephthalate) at a high spinning velocity, fibers having properties that are sufficient from a viewpoint of practical use are obtained without mechanically stretching the fibers. Prior examples of such high-speed spinning method have been disclosed (see PTLs 2 to 11). However, the 3-hydroxyalkanoate polymer which is different in crystallizability from the thermoplastic polyester has not been disclosed.

Further, disclosed as another prior example is a producing method of spinning hollow cross section yarn or multi-lobe cross section yarn of biodegradable aliphatic polyester at high speed while limiting a melt flow rate and a spinning temperature (see PTL 12). A molecular structure, such as a copolymerization ratio, of the 3-hydroxyalkanoate polymer significantly influences on the crystallizability and spinnability of the 3-hydroxyalkanoate polymer, and the strength of the obtained fiber. However, this prior example does not disclose or suggest an appropriate copolymerization ratio.

Furthermore, disclosed as yet another prior example is a producing method of melt-spinning a polylactic acid-polyethylene glycol copolymer at a speed of not less than 4,000 m/min (see PTL 13). A high-speed spinnability of this method is higher than that of a producing method of melt-spinning a polylactic acid alone. However, it is thought that since the polylactic acid that is easily hydrolyzed is copolymerized with a hydrophilic polyethylene glycol block, the polylactic acid-polyethylene glycol copolymer is more easily hydrolyzed. Thus, a problem is that the management of the amount of water absorption is difficult.

CITATION LIST

Patent Literature

PTL 1: Japanese Laid-Open Patent Application Publication No. 2002-371431
PTL 2: Japanese Laid-Open Patent Application Publication No. 60-134019
PTL 3: Japanese Laid-Open Patent Application Publication No. 60-134022
PTL 4: Japanese Laid-Open Patent Application Publication No. 05-005208
PTL 5: Japanese Laid-Open Patent Application Publication No. 05-287609
PTL 6: Japanese Laid-Open Patent Application Publication No. 05-321024
PTL 7: Japanese Laid-Open Patent Application Publication No. 06-017317
PTL 8: Japanese Laid-Open Patent Application Publication No. 06-287810
PTL 9: Japanese Laid-Open Patent Application Publication No. 11-241216
PTL 10: Japanese Laid-Open Patent Application Publication No. 2001-049526
PTL 11: Japanese Laid-Open Patent Application Publication No. 2002-105753
PTL 12: Japanese Laid-Open Patent Application Publication No. 11-061561
PTL 13: Japanese Laid-Open Patent Application Publication No. 10-037020

SUMMARY OF INVENTION

Technical Problem

An objective of the present invention is to improve spinnability, productivity, and tensile strength of a polyester fiber containing poly(3-hydroxybutyrate-co-3-hydroxyhexanoate).

Solution To Problem

The present inventors have diligently studied to achieve the above objective and found that the spinnability, productivity, and tensile strength of the polyester fiber can be improved by spinning the polyester resin containing the poly(3-hydroxybutyrate-co-3-hydroxyhexanoate) at a high spinning velocity.

The present invention relates to a polyester fiber obtained by spinning polyester resin containing poly(3-hydroxybutyrate-co-3-hydroxyhexanoate) at a spinning velocity of 1,500 to 7,000 m/min, wherein a ratio $I_\beta/I_\alpha$ is not less than 0.02 where $I_\alpha$ denotes a diffraction intensity from α-crystals, and $I_\beta$ denotes a diffraction intensity from β-crystals, the diffraction intensities $I_\alpha$ and $I_\beta$ being obtained by removing an influence by scattering of amorphous phase.

It is preferable that a percentage of 3-hydroxybutyrate as a monomer in the poly(3-hydroxybutyrate-co-3-hydroxyhexanoate) be 99.5 to 88.5 mol %.

It is preferable that when spinning the polyester resin containing the poly(3-hydroxybutyrate-co-3-hydroxyhexanoate), the polyester resin be extruded from a spinning die at a resin temperature of 145 to 190° C.

Advantageous Effects Of Invention

The present invention can improve the spinnability, productivity, and tensile strength of the polyester fiber containing the poly(3-hydroxybutyrate-co-3-hydroxyhexanoate).

DESCRIPTION OF EMBODIMENTS

Figure 1:
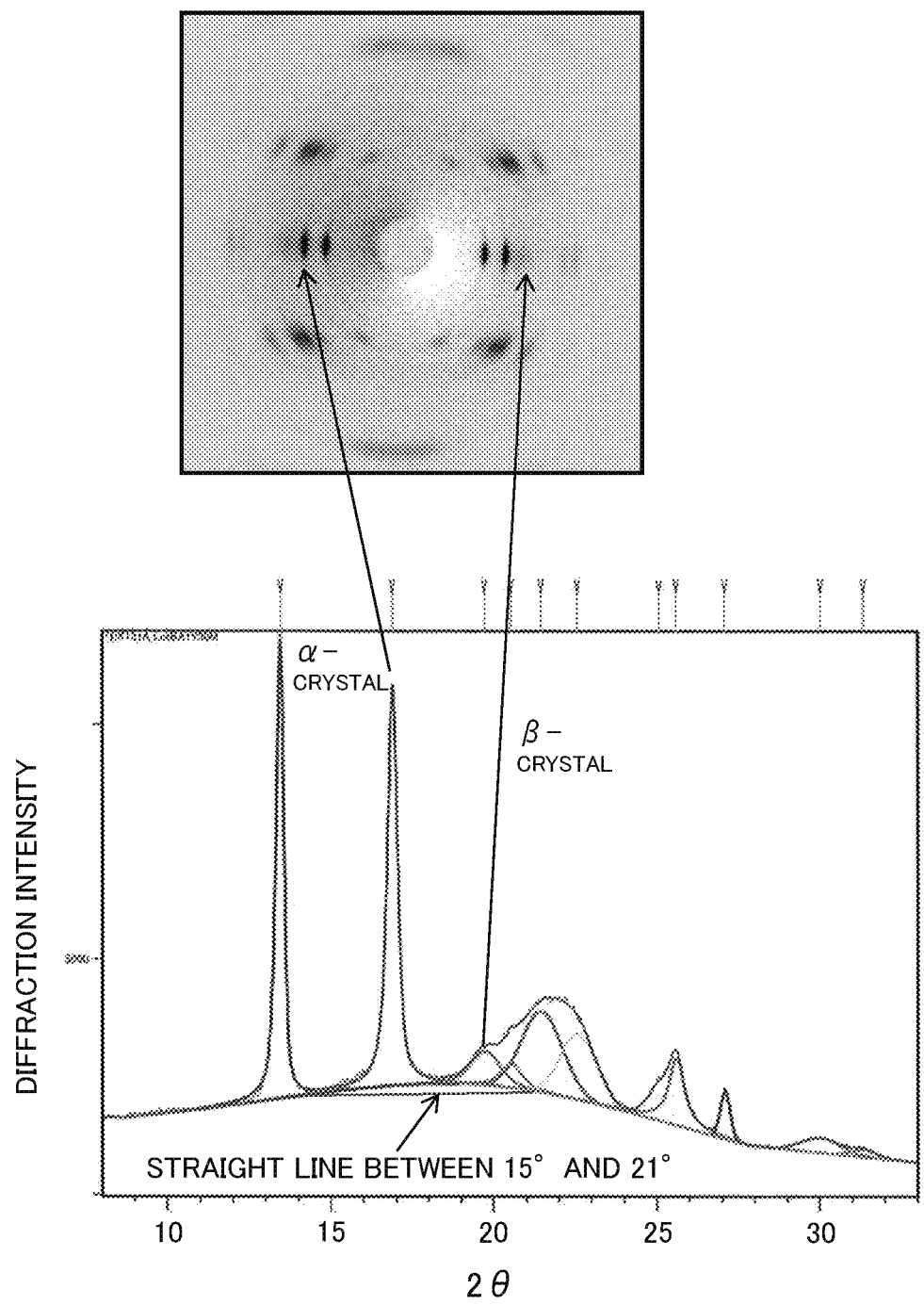
FIG. 1 shows an X-ray diffraction pattern and equatorial intensity distribution of a polyester fiber of the present invention.

Hereinafter, one example of preferred embodiments of the present invention will be specifically explained.

Poly(3-hydroxybutyrate-co-3-hydroxyhexanoate)

Poly(3-hydroxybutyrate-co-3-hydroxyhexanoate) (P3HB3HH) used in the present invention is produced in cellular bodies of microorganisms such as *Aeromonas caviae*. A preferable microorganism is, for example, *Alcaligenes eutrophus* AC32 obtained by introducing a P3HB3HH synthetase gene derived from *Aeromonas caviae* into *Alcaligenes eutrophus* (International Deposit under Budapest Treaty, International Depository Authority: National Institute of Technology and Evaluation Patent Mircoorganisms Depositary (6 Chuo, 1-1-1, Higashi, Tsukuba, Ibaraki, Japan), Date of Original Deposit: Aug. 12, 1996, transferred on Aug. 7, 1997, Deposit Number: FERM BP-6038 (transferred from original deposit FERM P-15786)) (T. Fukui, Y. Doi, J. Bateriol., 179, p4821-4830 (1997)).

These microorganisms are cultured under appropriate conditions, and the thus obtained cells having P3HB3HH accumulated therein are used. Other than the above microorganisms, genetically-modified microorganisms may also be used which are produced by introducing various PHA synthesis-related genes depending on the desired type of PHA to be produced. In this case, culture conditions including the type of a substrate may be optimized.

The weight-average molecular weight (hereinafter, sometimes referred to as Mw) of the P3HB3HH used in the present invention is preferably 150,000 to 1,500,000, more preferably 180,000 to 1,200,000, even more preferably 200,000 to 1,000,000. If the Mw is less than 150,000, there is a possibility that mechanical properties etc. are poor. If the Mw exceeds 1,500,000, there is a possibility that melt-spinning is difficult.

The Mw is measured by gel permeation chromatography using a gel permeation chromatograph ("Shodex GPC-101" manufactured by Showa Denko K.K.), a polystyrene gel column ("Shodex K-804" manufactured by Showa Denko K.K.), and chloroform as a mobile phase. The Mw can be determined as a molecular weight based on polystyrene standards. In this case, a calibration curve is prepared using polystyrene standards with weight-average molecular weights of 31,400, 197,000, 668,000, and 1,920,000.

A percentage of 3-hydroxybutyrate (hereinafter, sometimes referred to as 3HB) as a monomer in the P3HB3HH as a copolymer resin is preferably 99.5 to 88.5 mol %, more preferably 99 to 90 mol %, even more preferably 99 to 93 mol %, the 3HB constituting the copolymer resin. If the percentage of the 3HB in the P3HB3HH is more than 99.5 mol %, there is a possibility that a processing temperature is close to a pyrolysis temperature and thus molding processing is difficult. If the percentage of the 3HB in the P3HB3HH is less than 98 mol %, there is a possibility that the P3HB3HH is slowly crystallized and thus productivity is poor.

The percentage of the 3HB in the P3HB3HH can be measured by gas chromatography in the following manner. Two milliliters of a mixed solution of sulfuric acid and methanol (sulfuric acid/methanol=15/85 (weight ratio)) and 2 mL of chloroform are added to about 20 mg of the dry P3HB3HH, and the resulting mixture is hermetically sealed and heated at 100° C. for 140 minutes to obtain the polymer degradation product that is methyl ester. After the methyl ester is cooled, 1.5 g of sodium hydrogen carbonate is added thereto little by little for neutralization, and the resulting mixture is allowed to stand until the generation of carbon dioxide is stopped. Then, 4 mL of diisopropyl ether is added to and well mixed with the mixture, and then the monomer unit composition of the polymer degradation product in a supernatant is analyzed by capillary gas chromatography. Thus, the percentage of the 3HB in the P3HB3HH is determined.

The gas chromatography is performed using a gas chromatograph "GC-17A" manufactured by Shimadzu Corporation and a capillary column "NEUTRA BOND-1" (column length: 25 mm, column inner diameter: 0.25 mm, liquid film thickness: 0.4 μm) manufactured by GL Sciences Inc. Helium gas is used as a carrier gas, and a column inlet pressure is 100 kPa. The amount of a sample injected is 1 μL. Temperature conditions are as follows: temperature rise is performed at a rate of 8° C./min from an initial temperature of 100° C. to 200° C., and temperature rise is further performed at a rate of 30° C./min from 200 to 290° C.

Polyester Resin

The polyester resin of the present invention may be mixed with polyester resins such as poly(3-hydroxybutyrate-co-4-hydroxybutyrate) and poly(3-hydroxybutyrate-co-3-hydroxyvalerate) as long as those polyester resins can be melted at 145 to 190° C. and can be melted and kneaded with the P3HB3HH. In this case, the weight percentage of the P3HB3HH is preferably not less than 70 wt. %, more preferably not less than 80 wt. %.

Production of Polyester Fiber

According to the polyester fiber of the present invention, to improve processability without deteriorating characteristics of the polyester fiber, a lubricant, a plasticizer, or the like may be added to the P3HB3HH. The polyester fiber of the present invention is obtained by melting this mixture and then spinning the mixture at a spinning velocity of 1,500 to 7,000 m/min.

The above lubricant is not especially limited. Examples of the lubricant include: fatty acid amide, such as behenic acid amide, stearic acid amide, erucic acid amide, and oleic acid amide; alkylene fatty acid amide, such as methylenebis stearic acid amide and ethylenebis stearic acid amide; glycerol monofatty acid ester, such as polyethylene wax, oxidized polyester wax, glycerol monostearate, glycerol monobehenate, and glycerol monolaurate; organic acid monoglyceride, such as succinic acid saturated fatty acid monoglyceride; sorbitan fatty acid ester, such as sorbitan behenate, sorbitan stearate, and sorbitan laurate; polyglycerol fatty acid ester, such as diglycerol stearate, diglycerol laurate, tetraglycerol stearate, tetraglycerol laurate, decaglycerol stearate, and decaglycerol laurate; and higher alcohol fatty acid ester, such as stearyl stearate. These lubricants may be used alone or in combination of two or more.

Among the above lubricants, the fatty acid amide and the polyglycerol fatty acid ester are preferable since these are easy to obtain and high in effect.

The above plasticizer is not especially limited. Examples of the plasticizer include: modified glycerol-based compound, such as glycerol diacetate monolaurate, glycerol diacetate monocaprylate, and glycerol diacetate monodecanoate; adipic acid ester-based compound, such as diethylhexyl adipate, dioctyl adipate, and diisononyl adipate; polyether ester-based compound, such as polyethylene glycol dibenzoate, polyethylene glycol dicaprylate, and polyethylene glycol diisostearate; benzoic acid ester-based compound; epoxidized soybean oil; epoxidized fatty acid 2-ethylhexyl; and sebacic acid-based monoester. These plasticizers may be used alone or in combination of two or more.

Among the above plasticizers, the modified glycerol-based compound and the polyether ester-based compound are preferable since these are easy to obtain and high in effect.

A melt extruder used in the present invention may be a general device as long as it can appropriately maintain the molecular weight and melt viscosity of the P3HB3HH to be used. A compression extruder which maintains a melt portion at a certain temperature or a screw extruder which can perform continuous supply may be used. The former is suitable for small scale production of the melt extrusion, and the latter is suitable for industrial production. A temperature of the P3HB3HH at a position immediately under a nozzle of the extruder is not especially limited. However, when producing fibers, it is preferable to set a temperature not less than the glass transition temperature of the P3HB3HH and not more than 70° C. It is more preferable to set a temperature of not less than the glass transition temperature and not more than 60° C. since the energy consumption and the capacity of equipment can be reduced.

A melt-spinning temperature of the polyester fiber of the present invention is preferably 145 to 190° C., more preferably 150 to 190° C. If the spinning temperature is lower than 145° C., the mixture contains components which are not completely melted, and therefore, the spinning becomes unstable. When the percentage of the 3HB in the P3HB3HH is low, the components are completely melted. However, if the temperature is lower than 145° C., the viscosity is too high, and therefore, the spinning becomes unstable. If the temperature is higher than 190° C., the pyrolysis of the resin tends to occur. Therefore, the spinning becomes unstable, and the physical properties of the obtained fiber may deteriorate.

In the present invention, the melt-spinning temperature denotes the highest temperature range applied among temperatures used to obtain fibers from the polyester resin.

The P3HB3HH is melted, and then extruded from a spinning die while maintaining a certain throughput rate by adjusting the flow rate, and the fiber is then taken up. At this time, the area of an opening of the spinning die is preferably 0.15 to 3.5 mm$^2$. If the area of the opening is smaller than 0.15 mm$^2$, the fiber tends to break during the spinning, and therefore, the spinning velocity cannot be set to not less than 1,500 m/min. If the area of the opening exceeds 3.5 mm$^2$, the fiber immediately after extrusion becomes thick, and therefore, a time required for solidification increases. Thus, orientation of molecular chain in the extruded fiber may be relaxed, and the processability and the strength may not be improved. Further, in this case, the throughput rate is preferably 1 to 20 g/min/hole.

The spinning velocity of the present invention is not less than 1,500 m/min, preferably not less than 2,000 m/min. If the spinning velocity is less than 1,500 m/min, oriented crystals of the P3HB3HH are not adequately formed. Therefore, the production may become unstable, and the physical properties of the obtained fiber may be low. An upper limit of the spinning velocity is not especially determined. However, even if the upper limit of the spinning velocity is more than 7,000 m/min, the strength of the obtained fiber does not increase any more. Therefore, it is unnecessary to set the spinning velocity to more than 7,000 m/min.

The polyester fiber of the present invention contains a large amount of "β-crystals" formed by the "extended chain", and this improves melt spinnability.

The amount of β-crystals is obtained by wide angle X-ray diffraction. When an equatorial diffraction intensity distribution of an X-ray diffraction pattern is measured, the diffraction intensity is constituted by scattering of amorphous phase and diffraction of crystals (see FIG. 1). In the polyester fiber containing the poly(3-hydroxybutyrate-co-3-hydroxyhexanoate), the diffraction of the crystals includes the diffraction of α-crystals and the diffraction of β-crystals. Each of the α-crystal and the β-crystal causes the diffraction at a specific position depending on its structure, and the diffraction intensity of each of the α-crystal and the β-crystal is proportional to the amount of crystals.

Therefore, by calculating a ratio of the diffraction intensity based on the α-crystals to the diffraction intensity based on the β-crystals, an index regarding the amount of β-crystals can be obtained. It should be noted that the polyester fiber containing the poly(3-hydroxybutyrate-co-3-hydroxyhexanoate) may be low in the degree of crystallinity depending on the amount of 3-hydroxybutyrate contained in the fiber, and the intensity based on the scattering of the amorphous phase may be high. Therefore, to obtain the amount of β-crystals in the crystals, influences by the intensity based on the scattering of the amorphous phase need to be removed. As shown in FIG. 1, the intensity based on the scattering of the amorphous phase is observed as a base line with broad peak that is broader than the intensity based on the diffraction of the crystals. Therefore, the intensity represented by a line connecting the intensity at a diffraction angle of 15° and the intensity at a diffraction angle of 21° at each of which the influences by the diffraction of the crystals are small is regarded as the intensity based on the scattering of the amorphous phase, and this intensity based on the scattering of the amorphous phase is subtracted from the diffraction intensity. In the subsequent diffraction intensity distribution, a maximum diffraction intensity between 15° and 18° is a diffraction intensity ($T_\alpha$) from the α-crystals, and a maximum diffraction intensity between 18° and 21° is a diffraction intensity ($I_β$) from the β-crystals. The amount of β-crystals can be evaluated by relatively comparing $I_α$ and $I_β$. When $I_β/I_α$ that is a ratio of $I_β$ to $I_α$ is large, a large amount of β-crystals is contained.

The $I_β/I_α$ calculated by the above method is not less than 0.02, preferably not less than 0.05, more preferably not less than 0.1. If the $I_β/I_α$ is less than 0.02, the amount of β-crystals is small, and the improvement effect of the spinnability tends to be inadequate. An upper limit of the $I_β/I_α$ is not especially set.

According to a method of producing the polyester fiber of the present invention, the P3HB3HH is oriented and crystallized in a fiber axis direction when taking up the fiber. Therefore, the adequately high tensile strength can be obtained without applying a stretching process after the spinning. However, the stretching process may be added after the spinning according to need. In the case of adding the stretching process, it is preferable to perform the stretching immediately after the spinning. This is because if a time until the start of the stretching is long, partial crystallization in the polymer proceeds, and therefore, an original maximum stretching ratio decreases, and mechanical properties also deteriorate. Therefore, it is preferable that equipment for the stretching process be provided continuously with equipment for a fiber producing step. The time from the termination of the fiber producing step until the start of the stretching process is preferably not more than 120 minutes, more preferably not more than 60 minutes, further preferably not more than 30 minutes.

According to the polyester fiber of the present invention, the tensile strength can be increased as the $I_β/I_α$ increases.

The polyester fiber of the present invention may contain various additives as long as the advantageous effects of the present invention are not inhibited. Examples of the additives include: a nucleating agent; a hydrolysis inhibitor; an antioxidant; a mold release agent; an ultraviolet absorber; a coloring agent, such as a dye and a pigment; and an inorganic filler. These additives can be used according to a purpose.

According to the present invention, the polyester fiber produced as above can be suitably used in agriculture, fishery, forestry, clothing, non-clothing fiber products (such as curtains, carpets, and bags), sanitary articles, horticulture, vehicle members, building materials, medical care, food industry, and the other fields, as with a publicly known fiber.

EXAMPLES

Hereinbelow, the present invention will be described specifically with reference to the following examples, but the technical scope of the present invention is not limited to these examples.

Production Example 1

Production of P3HB3HH
KNK-005 strain (see U.S. Pat. No. 7,384,766) was used for culture production.

A seed culture medium (pH 6.8) had the following composition: 1 w/v % Meat-extract, 1 w/v % Bacto-Tryptone, 0.2 w/v % Yeast-extract, 0.9 w/v % $Na_2HPO_4.12H_2O$, and 0.15 w/v % $KH_2PO_4$.

A preculture medium had the following composition: 1.1 w/v % $Na_2HPO_4.12H_2O$, 0.19 w/v % $KH_2PO_4$, 1.29 w/v % $(NH_4)_2SO_4$, 0.1 w/v % $MgSO_4.7H_2O$, and 0.5 v/v % trace metal salt solution (obtained by dissolving 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$ in 0.1 N hydrochloric acid). As a carbon source, palm oil was added at one time in a concentration of 10 g/L.

A P3HB3HH production medium had the following composition: 0.385 w/v % $Na_2HPO_4.12H_2O$, 0.067 w/v % $KH_2PO_4$, 0.291 w/v % $(NH_4)_2SO_4$, 0.1 w/v % $MgSO_4.7H_2O$, 0.5 v/v % trace metal salt solution (obtained by dissolving 1.6 w/v % $FeCl_3.6H_2O$, 1 w/v % $CaCl_2.2H_2O$, 0.02 w/v % $CoCl_2.6H_2O$, 0.016 w/v % $CuSO_4.5H_2O$, and 0.012 w/v % $NiCl_2.6H_2O$ in 0.1 N hydrochloric acid), and 0.05 w/v % BIOSPUREX200K (defoaming agent: manufactured by Cognis Japan Ltd.).

First, a glycerol stock of KNK-005 strain (50 μL) was inoculated into the seed culture medium (10 mL) and seed-cultured for 24 hours to obtain a seed culture. Then, the seed culture was inoculated at 1.0 v/v % into a 3-liter jar fermenter (MDL-300 manufactured by B. E. MARUBISHI Co., Ltd.) containing 1.8 L of the preculture medium. The jar fermenter was operated under conditions of a culture temperature of 33° C., a stirring speed of 500 rpm, and a ventilation volume of 1.8 L/min to perform preculture for 28 hours while pH was controlled to fall within the range from 6.7 to 6.8 to obtain a preculture. The pH control was performed using a 14% aqueous ammonium hydroxide solution.

Then, the preculture liquid was inoculated at 1.0 v/v % into a 10-liter jar fermenter (MDS-1000 manufactured by B. E. MARUBISHI Co., Ltd.) containing 6 L of the production medium. The jar fermenter was operated under conditions of a culture temperature of 28° C., a stirring speed of 400 rpm, and a ventilation volume of 6.0 L/min, and pH was controlled to fall within the range from 6.7 to 6.8. The pH control was performed using a 14% aqueous ammonium hydroxide solution. As a carbon source, palm oil was used. The culture was performed for 64 hours. After the completion of culture, cells were collected by centrifugation, washed with methanol, and freeze-dried, and the weight of the dried cells was measured.

One hundred mL of chloroform was added to 1 g of the obtained dried cells, and the mixture was stirred at room temperature all day and night to extract P3HB3HH in the cells. The cell debris was filtered out, and then the filtrate was concentrated by an evaporator until its total volume was reduced to 30 mL. Then, 90 mL of hexane was gradually added, and the mixture was allowed to stand for 1 hour while being slowly stirred. The precipitated P3HB3HH was collected by filtration and then vacuum-dried at 50° C. for 3 hours. In this way, P3HB3HH was obtained.

The 3HH content of the obtained P3HB3HH was measured by gas chromatography in the following manner. Two milliliters of a sulfuric acid/methanol mixed solution (15:85) and 2 mL of chloroform were added to 20 mg of the dried P3HB3HH, and the mixture was hermetically sealed and heated at 100° C. for 140 minutes to obtain the P3HB3HH degradation product that is methyl ester. After cooled, the P3HB3HH degradation product that is methyl ester was neutralized by adding 1.5 g of sodium hydrogen carbonate little by little, and the mixture was allowed to stand until the generation of carbon dioxide was stopped. The mixture was well mixed with 4 mL of diisopropyl ether and then centrifuged, and then the monomer unit composition of the polyester degradation product in the supernatant was analyzed by capillary gas chromatography. A gas chromatograph and a capillary column used were "GC-17A" manufactured by Shimadzu Corporation and "NEUTRA BOND-1" manufactured by GL Sciences Inc. (column length: 25 m, column inner diameter: 0.25 mm, liquid membrane thickness: 0.4 μm), respectively. A carrier gas used was He, the pressure at column inlet was 100 kPa, and the amount of a sample injected was 1 μL. The capillary gas chromatography was performed under conditions where the temperature was increased from an initial temperature of 100° C. to 200° C. at a rate of 8° C./min and further increased from 200 to 290° C. at a rate of 30° C/min. As a result of analysis under the above conditions, the percentage of the 3-hydroxyhexanoate (3HH) in the P3HB3HH was 5.4 mol %. The percentage of the 3-hydroxybutyrate (3HB) in the P3HB3HH was 94.6 mol %. The weight-average molecular weight Mw of the P3HB3HH measured by GPC was 610,000, and the melting point of the P3HB3HH was 141° C.

Examples 1 to 10 and Comparative Examples 1 to 3

Figure 2:
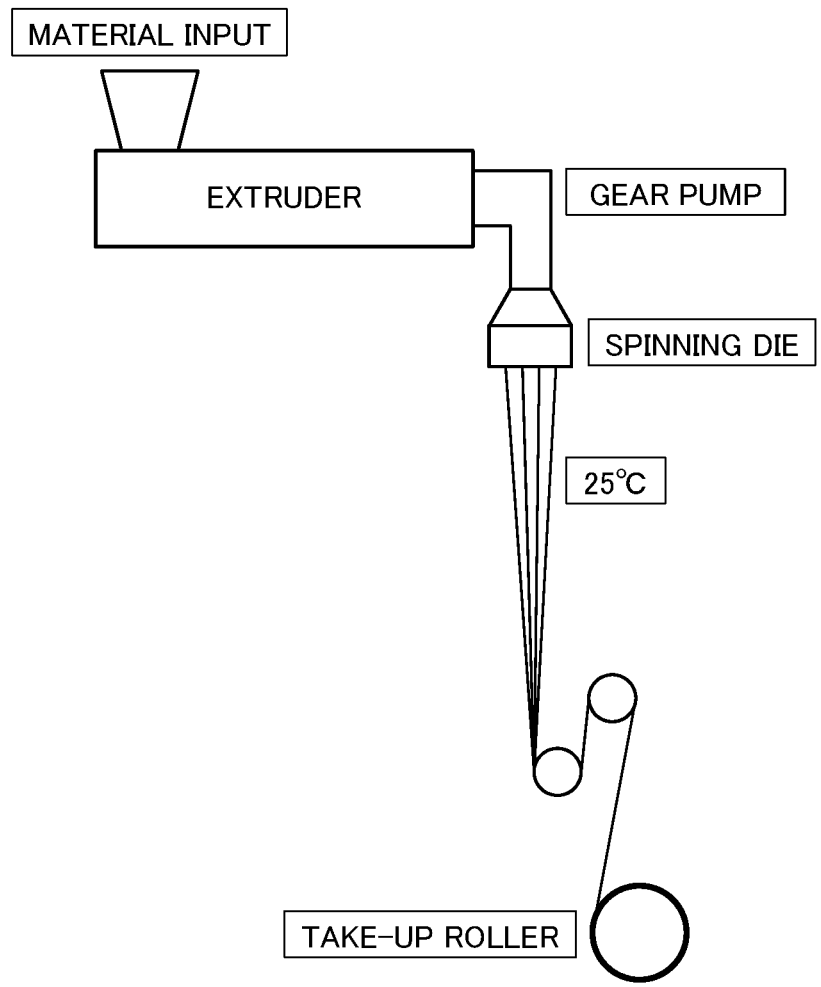
FIG. 2 is a schematic diagram showing a method of performing high-speed spinning of the polyester fiber of the present invention.

Melt-spinning 0.5 part by weight of the behenic acid amide was dry-blended with the P3HB3HH (100 parts by weight) obtained in Production Example 1, and the mixture was melted and kneaded at 130 to 160° C. using a twin screw extruder (TEM26SS) manufactured by Toshiba Machine Co., Ltd. Thus, a pellet was obtained. The Mw of the obtained pellet was 530,000. Next, as shown in FIG. 2, the pellet was melted by a single screw extruder having a screw diameter of 20 mm. The flow rate was adjusted by a gear pump. The pellet was extruded from a spinning die having a melt-spinning temperature of 160 to 180° C. to an atmosphere having an ambient temperature of 25° C. at 5.00 g/min/hole that is the throughput rate of resin per hole. The spinning die had four spinning holes, and the diameter of each spinning hole was 1 mm. The fiber was taken up at a spinning velocity of 1,000 to 6,000 m/min by a take-up roll having a temperature of 25° C. Thus, the polyester fiber was obtained.

Table 1 shows production conditions, such as the melt-spinning temperature and the spinning velocity.

The obtained polyester fiber was evaluated as below.

Spinnability

Regarding the spinnability, the states of the polyester fibers extruded from the four spinning holes of the die and taken up by the take-up roll were visually evaluated. Results are shown in Table 1.

Excellent: The fibers do not stick to the roll, do not stick to one another, and are separable one by one.

Not so good: The fibers do not stick to the roll but partially stick to one another.

Poor: The fibers stick to the roll and/or stick to one another.

Amount of β-crystals

The amount of β-crystals was measured using an X-ray diffractometer (RINT) manufactured by Rigaku Corporation, and a nickel filtered CuKα ray generated by a filament voltage of 45 kV and a filament current of 60 mA was used. Regarding the diffraction intensity, a two-dimensional diffraction pattern was measured using Mercury CCD manufactured by Rigaku Corporation, and a diffraction intensity distribution was calculated based on the equatorial intensity of the two-dimensional diffraction pattern. A distance between the sample and the camera was set to 48.92 mm, and the diffraction angle was corrected by utilizing reflection from the 111 plane of the silicon crystal.

In a diffraction angle range between 15° and 21° in the obtained diffraction intensity distribution, the intensity represented by a straight line drawn from the intensity at the diffraction angle of 15° to the intensity at the diffraction angle of 21° is regarded as the intensity based on the scattering of the amorphous phase, and this intensity based on the scattering of the amorphous phase was subtracted from the diffraction intensity. Then, a maximum diffraction intensity between 15° and 18° was regarded as $I_\alpha$, and a maximum diffraction intensity between 18° and 21° was regarded as $I_\beta$. Thus, $I_\beta/I_\alpha$ that was an index of the amount of β-crystals was calculated. Results are shown in Table 1.

Tensile Strength

The tensile strength of the obtained fiber was measured under the following conditions using a tensile testing machine "Autograph AG-I" manufactured by Shimadzu Corporation. To be specific, an initial length of the sample was 20 mm, and the tensile strength was measured at a tensile speed of 20 mm/min. Results are shown in Table 1.

Birefringence

Birefringence was measured using an interference microscope "Interphako" manufactured by Carl Zeiss Jena in accordance with the methods described in SEN'I GAKKAI-SHI (Journal of Fiber), Vol.66, No.1 (2010), P-39. Used as an immersion liquid was oil having a refractive index of 1.4813. Results are shown in Table 1.

Weight-average Molecular Weight

The weight-average molecular weight was measured by gel permeation chromatography using a gel permeation chromatograph ("Shodex GPC-101" manufactured by Showa Denko K.K.), a polystyrene gel column ("Shodex K-804" manufactured by Showa Denko K.K.), and chloroform as a mobile phase. The weight-average molecular weight was determined as a molecular weight based on polystyrene standards. In this case, a calibration curve was prepared using polystyrene standards with weight-average molecular weights of 31,400, 197,000, 668,000, and 1,920,000. Results are shown in Table 1.

Examples 11 to 18 and Comparative Examples 4 to 8

Melt-spinning 0.5 part by weight of the behenic acid amide was dry-blended with the P3HB3HH (100 parts by weight) obtained in Production Example 1, and the mixture was melted, blended and kneaded at 130 to 160° C. and pelletized using a twin screw extruder (TEM26SS) manufactured by Toshiba Machine Co., Ltd. Thus, pellets were obtained. The Mw of the obtained pellet was 530,000. Next, the pellet was melted by a single screw extruder having a screw diameter of 20 mm. The flow rate was adjusted by a gear pump. The pellet was extruded from a spinning die at a melt-spinning temperature of 180° C. to an outside having an ambient temperature of 25° C. at 1.25 to 5.00 g/min/hole that is the throughput rate of resin per hole. The spinning die had four spinning holes, and the diameter of each spinning hole was 1 mm. The fiber was taken up at a spinning velocity of 500 to 4,000 m/min by a take-up roll having a temperature of 25° C. Thus, the polyester fiber was obtained.

Table 1 shows the production conditions, such as the melt-spinning temperature and the spinning velocity, and also shows results obtained by evaluating the polyester fiber in the same manner as Example 1.

TABLE 1

|  |  | Comparative Ex. 1 | Ex. 1 | Ex. 2 | Ex. 3 | Ex. 4 | Comparative Ex. 2 | Ex. 5 |
|---|---|---|---|---|---|---|---|---|
| Melt-spinning temperature | °C. | 160 | 160 | 160 | 160 | 160 | 170 | 170 |
| Throughput rate | g/min/hole | 5.00 | 5.00 | 5.00 | 5.00 | 5.00 | 5.00 | 5.00 |
| Spinning velocity | m/min | 1,000 | 2,000 | 3,000 | 4,000 | 5,000 | 1,000 | 2,000 |
| Spinnability |  | Not so good | Excellent | Excellent | Excellent | Excellent | Not so good | Excellent |
| $I_\beta/I_\alpha$ |  | 0.009 | 0.027 | 0.054 | 0.098 | 0.093 | 0.011 | 0.034 |
| Tensile strength TS | MPa | 49 | 63 | 63 | 65 | 67 | 30 | 42 |
| Birefringence $\Delta\eta$ | *1/1,000 | −10 | −18 | −19 | −19 | −18 | −11 | −18 |
| Weight-average molecular weight | *1,000 | 286 | 301 | 312 | 336 | 348 | 286 | 291 |

|  |  | Ex. 6 | Ex. 7 | Ex. 8 | Comparative Ex. 3 | Ex. 9 | Ex. 10 | Comparative Ex. 4 |
|---|---|---|---|---|---|---|---|---|
| Melt-spinning temperature | °C. | 170 | 170 | 170 | 180 | 180 | 180 | 180 |
| Throughput rate | g/min/hole | 5.00 | 5.00 | 5.00 | 5.00 | 5.00 | 5.00 | 1.25 |
| Spinning velocity | m/min | 3,000 | 4,000 | 5,000 | 1,000 | 5,000 | 6,000 | 500 |
| Spinnability |  | Excellent | Excellent | Excellent | Not so good | Excellent | Excellent | Poor |
| $I_\beta/I_\alpha$ |  | 0.057 | 0.065 | 0.073 | 0.000 | 0.105 | 0.118 | 0.007 |
| Tensile strength TS | MPa | 59 | 61 | 63 | 26 | 55 | 61 | 38 |
| Birefringence $\Delta\eta$ | *1/1,000 | −19 | −19 | −17 | −4 | −17 | −17 | −4 |
| Weight-average molecular weight | *1,000 | 297 | 296 | 297 | 228 | 230 | 232 | 203 |

|  |  | Comparative Ex. 5 | Ex. 11 | Ex. 12 | Ex. 13 | Comparative Ex. 6 | Comparative Ex. 7 | Ex. 14 |
|---|---|---|---|---|---|---|---|---|
| Melt-spinning temperature | °C. | 180 | 180 | 180 | 180 | 180 | 180 | 180 |
| Throughput rate | g/min/hole | 1.25 | 1.25 | 1.25 | 1.25 | 2.50 | 2.50 | 2.50 |
| Spinning velocity | m/min | 1,000 | 2,000 | 3,000 | 4,000 | 500 | 1,000 | 2,000 |
| Spinnability |  | Not so good | Excellent | Excellent | Excellent | Not so good | Not so good | Excellent |
| $I_\beta/I_\alpha$ |  | 0.004 | 0.030 | 0.095 | 0.133 | 0.008 | 0.006 | 0.037 |
| Tensile strength TS | MPa | 39 | 48 | 59 | 83 | 45 | 46 | 53 |
| Birefringence $\Delta\eta$ | *1/1,000 | −9 | −17 | −17 | −14 | −8 | −12 | −18 |
| Weight-average molecular weight | *1,000 | 206 | 204 | 202 | 203 | 264 | 265 | 262 |

|  |  | Ex. 15 | Ex. 16 | Comparative Ex. 8 | Ex. 17 | Ex. 18 |
|---|---|---|---|---|---|---|
| Melt-spinning temperature | °C. | 180 | 180 | 180 | 180 | 180 |
| Throughput rate | g/min/hole | 2.50 | 2.50 | 5.00 | 5.00 | 5.00 |
| Spinning velocity | m/min | 3,000 | 4,000 | 500 | 2,000 | 3,000 |
| Spinnability |  | Excellent | Excellent | Not so good | Excellent | Excellent |
| $I_\beta/I_\alpha$ |  | 0.091 | 0.107 | 0.011 | 0.034 | 0.074 |
| Tensile strength TS | MPa | 68 | 88 | 50 | 108 | 101 |
| Birefringence $\Delta\eta$ | *1/1,000 | −18 | −16 | −10 | −18 | −18 |
| Weight-average molecular weight | *1,000 | 260 | 260 | 331 | 327 | 325 |

The invention claimed is:

1. A polyester fiber produced by spinning a polyester resin comprising poly(3-hydroxybutyrate-co-3-hydroxyhexanoate) at a spinning velocity of from 1,500 to 7,000 m/min,
   wherein the polyester fiber has a ratio $I_\beta/I_\alpha$ of not less than 0.02, where $I_\alpha$ denotes a diffraction intensity from α-crystals, $I_\beta$ denotes a diffraction intensity from β-crystals, and an influence on $I_\alpha$ and $I_\beta$ caused by an amorphous phase in the polyester fiber is removed when measuring $I_\alpha$ and $I_\beta$.

2. The polyester fiber according to claim 1, wherein the poly(3-hydroxybutyrate-co-3-hydroxyhexanoate) comprises 3-hydroxybutyrate as a monomer in an amount of from 99.5 to 88.5 mol %.

3. The polyester fiber according to claim 1, wherein the spinning of the polyester resin comprises extruding the polyester resin from a spinning die at a resin temperature of from 145 to 190° C.

4. The polyester fiber according to claim 1, wherein the poly(3-hydroxybutyrate-co-3-hydroxyhexanoate) has a weight-average molecular weight of from 150,000 to 1,500,000.

5. The polyester fiber according to claim 1, wherein the poly(3-hydroxybutyrate-co-3-hydroxyhexanoate) has a weight-average molecular weight of from 200,000 to 1,000,000.

6. The polyester fiber according to claim 1, wherein the poly(3-hydroxybutyrate-co-3-hydroxyhexanoate) comprises 3-hydroxybutyrate as a monomer in an amount of from 99 to 93 mol %.

7. The polyester fiber according to claim 1, wherein the polyester resin comprises not less than 70 wt % of the poly(3-hydroxybutyrate-co-3-hydroxyhexanoate).

8. The polyester fiber according to claim 1, wherein the polyester resin further comprises at least one of a lubricant and a plasticizer.

9. A method for producing a polyester fiber, comprising:
spinning a polyester resin comprising poly(3-hydroxybutyrate-co-3-hydroxyhexanoate) at a spinning velocity of from 1,500 to 7,000 m/min such that a polyester fiber is produced and that the polyester fiber has a ratio $I_\beta/I_\alpha$ of not less than 0.02, where $I_\alpha$ denotes a diffraction intensity from α-crystals, $I_\beta$ denotes a diffraction intensity from β-crystals, and an influence on $I_\alpha$ and $I_\beta$ caused by an amorphous phase in the polyester fiber is removed when measuring $I_\alpha$ and $I_\beta$.

10. The method according to claim 9, wherein the spinning of the polyester resin comprises extruding the polyester resin from a spinning die at a resin temperature of from 145 to 190° C.

11. The method according to claim 9, wherein the spinning of the polyester resin comprises extruding the polyester resin from a spinning die at a resin temperature of from 150 to 190° C.

12. The method according to claim 9, wherein the spinning die has an opening having an area of from 0.15 mm² to 3.5 mm².

13. The method according to claim 9, wherein, in the spinning, the spinning velocity is from 2,000 to 7,000 m/min.

14. The method according to claim 9, further comprising:
culturing a microorganism such that the poly(3-hydroxybutyrate-co-3-hydroxyhexanoate) is accumulated in the microorganism.

15. The method according to claim 9, wherein the poly(3-hydroxybutyrate-co-3-hydroxyhexanoate) comprises 3-hydroxybutyrate as a monomer in an amount of from 99.5 to 88.5 mol %.

16. The method according to claim 9, wherein the poly(3-hydroxybutyrate-co-3-hydroxyhexanoate) has a weight-average molecular weight of from 150,000 to 1,500,000.

17. The method according to claim 9, wherein the poly(3-hydroxybutyrate-co-3-hydroxyhexanoate) comprises 3-hydroxybutyrate as a monomer in an amount of from 99 to 93 mol %.

18. The method according to claim 9, wherein the polyester resin comprises not less than 70 wt % of the poly(3-hydroxybutyrate-co-3-hydroxyhexanoate).

19. The method according to claim 9, wherein the polyester resin further comprises at least one of a lubricant and a plasticizer.

20. The method according to claim 9, further comprising:
stretching the polyester fiber within 120 minutes after the spinning of the polyester resin is completed.

21. A polyester fiber produced by spinning a polyester resin comprising poly(3-hydroxybutyrate-co-3-hydroxyhexanoate),
wherein the polyester fiber has a ratio $I_\beta/I_\alpha$ of not less than 0.02, where $I_\alpha$ denotes a diffraction intensity from α-crystals, $I_\beta$ denotes a diffraction intensity from β-crystals, and an influence on $I_\alpha$ and $I_\beta$ caused by an amorphous phase in the polyester fiber is removed when measuring $I_\alpha$ and $I_\beta$.

22. The polyester fiber of claim 21, wherein a spinning velocity is not less than 1,500 m/min.

* * * * *